United States Patent [19]

Grimes

[11] Patent Number: 4,869,543

[45] Date of Patent: Sep. 26, 1989

[54] AUTOMOTIVE ARMREST

[75] Inventor: John A. Grimes, Dover, N.H.

[73] Assignee: Davidson Textron Inc., Dover, N.H.

[21] Appl. No.: 231,275

[22] Filed: Aug. 12, 1988

[51] Int. Cl.⁴ .............................................. B60N 1/02
[52] U.S. Cl. .................................... 296/153; 297/411;
 248/118
[58] Field of Search ......................... 296/153; 248/118;
 297/411, 412

[56] References Cited

U.S. PATENT DOCUMENTS

| 1,960,135 | 5/1934 | Blum | 296/153 |
|---|---|---|---|
| 2,601,677 | 6/1952 | Wettlaufer | 296/153 |
| 3,620,566 | 11/1971 | Leconte | 296/153 |
| 4,659,135 | 4/1987 | Johnson | 296/153 |
| 4,667,979 | 5/1987 | Wolff | 296/153 |
| 4,783,114 | 11/1988 | Welch | 296/153 |

FOREIGN PATENT DOCUMENTS 67-129  4/1984  Japan .

Primary Examiner—Robert R. Song
Attorney, Agent, or Firm—John C. Evans; John P. Moran

[57] ABSTRACT

An armrest for a door of an automotive vehicle, including a molded shell having a substantially flat top wall portion, an interior shelf portion parallel to the flat top wall portion, a plurality of vertical ribs supporting the shelf portion, and a plurality of abutment ribs intermediate an inner edge of the shelf portion and the flat top wall portion. A back plate is integrally connected to the free end of the flat top wall portion via a living hinge. A foam slab or block is slip fitted into the pocket formed by the flat top wall portion, the shelf portion and the abutment ribs, and retained therein by the closure of the back plate against the free end of the shelf portion.

3 Claims, 1 Drawing Sheet

AUTOMOTIVE ARMREST

TECHNICAL FIELD

This invention relates generally to armrests for doors of automotive vehicles and, more particularly, to an armrest including a molded shell having a backplate connected thereto by a living hinge for permitting the insertion of a separately formed foam slab into a pocket of the armrest before closing the backplate.

BACKGROUND ART

In early prior art arragements, sponge rubber cushions have been glued to metal plates and then upholstered, as shown and described in U.S. Pat. No. 1,960,135, or mounted on a metal plate and covered by a flexible material or fabric, as shown and described in U.S. Pat. No. 2,601,677.

More recently, a mold has typically been injected with a suitable material to form a shell, after which foam is injected to fill the space between the shell and a metal back plate which is adapted to being attached to the door.

In U.S. Pat. No. 3,620,566, a semirigid foam or cellular padding element 12 is mounted on a cardboard sheet supported on bent sheet metal lugs, and adapted to being covered by a prefabricated flexible body which, in turn, is adapted to being snap-connected at upper and lower edges thereof to a base plate mountable on the automotive door.

DISCLOSURE OF THE INVENTION

A general object of the invention is to provide an improved armrest for automotive doors.

Another object of the invention is to provide an improved automotive armrest wherein the need for providing foaming within an outer shell has been eliminated.

A further object of the invention is to provide an automotive armrest wherein a separately molded foam slab is insertable into a pocket of a molded shell wherein the pocket is formed by the shell flat top wall portion, an inner shelf portion parallel to the flat to wall portion, and a plurality of abutment ribs therebetween, and having a backplate connected to the free end of the flat top wall portion by a living hinge for covering the inserted foam slab.

These and other objects and advantages will become more apparent when reference is made to the following drawings and the accompanying description.

BEST MODE OF CARRYING OUT THE INVENTION

Figure 1:
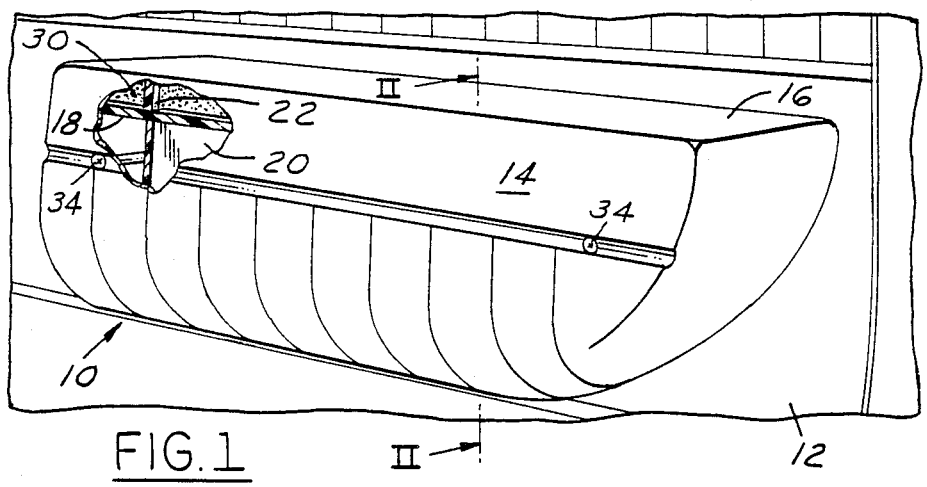
FIG. 1 is a perspective view of an automotive armrest embodying the invention.
Figure 2:
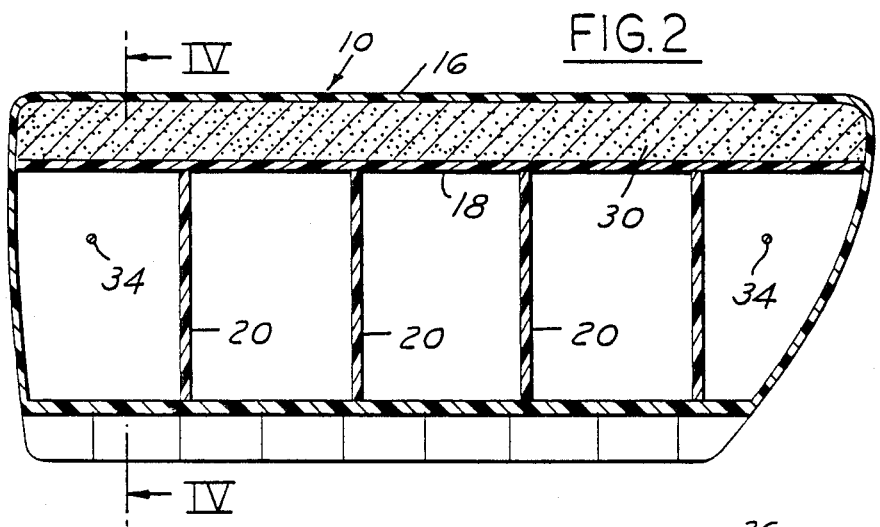
FIG. 2 is a cross-sectional view taken along the plane of the line 2—2 of FIG. 1, and looking in the direction of the arrows.
Figures 3, 4:
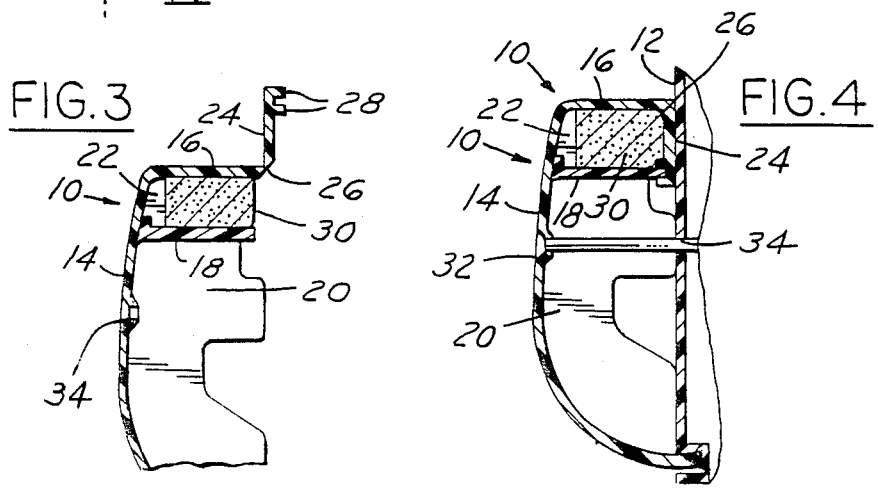
FIGS. 3 and 4 are cross-sectional views taken along the plane of the line 4—4 of FIG. 2, and looking in the direction of the arrows, with FIG. 3 illustrating an initial assembly step and FIG. 4 a final assembly step.

Referring now to the drawings in greater detail, FIGS. 1 and 4 illustrate an armrest 10 mounted on a door 12 of an automotive vehicle. The armrest 10 comprises a molded shell 14 having a substantially horizontal top wall portion 16, and formed to include a support shelf portion 18 parallel to and located a predetermined distance below the top wall portion 16, a plurality of spaced vertical ribs 20 supporting the full width of the shelf 18, and a plurality of spaced abutment ribs 22 formed within the shell 14 on top of an inner edge of the shelf portion 18 for a purpose to be described.

The molded shell 14 further includes a back plate 24 (FIGS. 3 and 4) integrally connected thereto by a living hinge 26. A pair of spaced flanges 28 are formed on the distal end of the back plate 24, adapted to grip the free edge of the shelf portion 18 when the back plate is bent around the living hinge 26 from the fully open position in FIG. 3 to the fully closed position in FIG. 4.

Prior to closing the back plate 24, a separately molded foam slab or block 30 of predetermined dimensions is slid into place in the pocket formed by the shelf portion 18, the top wall portion 16, and the abutment ribs 22, as shown in FIG. 3. The foam slab 30 is confined in place, without gluing, by the closing of the back plate 24, as shown in FIG. 4.

The armrest 10 is then secured to the door 12 by suitable fasteners, such as screws 32 mounted through openings 34 in the molded shell 14.

INDUSTRIAL APPLICABILITY

It should be apparent that the invention provides an improved armrest arrangement wherein a separate foam slab is used in conjunction with a molded shell, in lieu of the injection molding of foam into the shell while the shell is in a mold with a separate metal back plate to limit the foaming process.

While but one embodiment of the invention has been shown and described, other modifications are possible within the scope of the following claims.

I claim:

1. For use with an automotive door, an armrest comprising a shell including a substantially flat top wall portion, an interior shelf portion parallel to said flat top wall portion, a plurality of vertical ribs supporting said shelf portion, a plurality of abutment ribs intermediate an inner edge of said shelf portion and the flat top wall portion, and a back plate portion connected to the end of said flat top wall portion by a living hinge, and a foam slab slip fitted into position between said shelf portion and said flat top wall portion against said abutment ribs and adapted to be retained therein by said back plate portion when closed about said living hinge.

2. The armrest described in claim 1, and a pair of spaced flanges formed on the distal end of said back plate portion and adapted to grip the free edge of said shelf portion when the backplate portion is bent around the living hinge from the fully open position to the fully closed position to thereby retain said foam slab in position.

3. The armrest described in claim 1, and a plurality of openings formed in a side portion of said shell for the insertion therethrough of fasteners to secure the armrest to said automotive door.

* * * *